US005617540A

United States Patent [19]
Civanlar et al.

[11] Patent Number: 5,617,540
[45] Date of Patent: Apr. 1, 1997

[54] SYSTEM FOR BINDING HOST NAME OF SERVERS AND ADDRESS OF AVAILABLE SERVER IN CACHE WITHIN CLIENT AND FOR CLEARING CACHE PRIOR TO CLIENT ESTABLISHES CONNECTION

[75] Inventors: Seyhan Civanlar, Middletown Township, Monmouth County; Vikram R. Saksena, Freehold, both of N.J.

[73] Assignee: AT&T, Middletown, N.J.

[21] Appl. No.: 509,307

[22] Filed: Jul. 31, 1995

[51] Int. Cl.$^6$ .................................................. G06F 13/00
[52] U.S. Cl. ........................................................ 395/200.11
[58] Field of Search .................................. 395/823, 824, 395/829, 846, 200.02, 200.06, 200.09, 200.11, 200.12

[56] References Cited

U.S. PATENT DOCUMENTS

| 5,025,491 | 6/1991 | Tsuchiya et al. | 340/825.52 |
|---|---|---|---|
| 5,136,716 | 8/1992 | Harvey et al. | 395/800 |
| 5,287,103 | 2/1994 | Kaspryzk et al. | 340/825.52 |
| 5,454,078 | 9/1995 | Heimsoth et al. | 395/200.1 |
| 5,463,735 | 10/1995 | Pascucci et al. | 395/200.1 |
| 5,526,489 | 6/1996 | Nilakantan et al. | 395/200.02 |

OTHER PUBLICATIONS

"Mosaic and the World–Wide Web", Vetter et al, IEEE Oct. 1994, pp. 49–51.
"Multiple Protocol Network Integration: A Case Study in Internetworking with IP/IPX", IEEE 92, pp. 560–567.
"Understanding Data Communication & Networks", Shay, PWS Publishing, ©1994, pp. 417–421; 440–449.
"OSI –An Appropriate Basis for Group Communications ?" Jakobs, IEEE Sep. 1989, pp. 346–350.
"IP Addressing & Routing in a Local Wireless Network", Cohen et al, IEEE 92, pp. 626–632.
"Ubiquitous Mobile Host Internetworking" Johnson, IEEE 93, pp. 85–90.

*Primary Examiner*—Thomas C. Lee
*Assistant Examiner*—Moustafa Mohamed Meky
*Attorney, Agent, or Firm*—Stephen M. Gurey

[57] ABSTRACT

A name mapper, name servers, and multimedia servers are connected to a multimedia manager. Each client has the name of a multimedia server, i.e., a virtual host name, from which it can obtain multimedia service. The name server stores associations of server host names to layer-3 addresses. When a client initiates a multimedia session, it requests the layer-3 address of the server that corresponds to its server's name. The name server sends the layer-3 address of the one of the multimedia servers that is currently designated as corresponding to that name. The multimedia client stores the name-to-layer-3 address binding in it's cache. The multimedia client then establishes communications with the multimedia server at that layer-3 address and clears its cache. The dynamic name-to-layer-3 address binding in the name server is managed by the name mapper, which may be collocated with the multimedia manager or may be located on a separate server. The multimedia server manager collects real-time status information so that it knows the availability of the multimedia servers in the network. If a multimedia server, whose layer-3 address is presently mapped to from a virtual host name, becomes unable to serve additional clients, the multimedia server manager sends a message to the name mapper to modify the name to layer-3 address binding. The modification specifies an available server's layer-3 address to be bound in place of that of the server that became unable to serve additional clients.

4 Claims, 5 Drawing Sheets

SYSTEM FOR BINDING HOST NAME OF SERVERS AND ADDRESS OF AVAILABLE SERVER IN CACHE WITHIN CLIENT AND FOR CLEARING CACHE PRIOR TO CLIENT ESTABLISHES CONNECTION

CROSS-REFERENCE TO RELATED APPLICATION

Related subject matter is disclosed in the following application filed concurrently herewith and assigned to the same Assignee hereof: U.S. patent application Ser. No. 08/509,308, entitled "Floating Multimedia Servers", inventors Seyhan Civanlar and Vikram R. Saksena, still pending.

Technical Field

This invention relates to obtaining multimedia services in a distributed server environment.

BACKGROUND OF THE INVENTION

According to the client-server model, a client program running on a user's computer sends a message requesting service to a server program running on another computer. The server responds with a message to the client, the content of which can be a requested file or an indication of availability of the requested file. In exchanging these messages standard protocols are used between clients and servers.

Asynchronous Transfer Mode (ATM) provides the networking infrastructure and high-bandwidth necessary to support many multimedia (video, audio, and data) applications. Such applications are likely to use the client-server architecture. The server will be ATM-attached, so as to present the multimedia content to a large pool of clients. Each client, whether ATM-attached or legacy LAN-attached, knows the name of a server to which it can connect to obtain multimedia service.

The first step in opening communications between a client and a server is to establish a connection from the client to the server. Using Internet Protocol (IP), for example, each host, client or server, has an IP address which uniquely identifies an IP application on the host. IP addresses are layer-3 addresses in the OSI 7-layer model. If a client wants to communicate with a server, it must establish a connection, commonly called a "socket", between itself and the server. In order to build the connection, the client will need to know the IP address of the server.

It is known in the prior art that each host can be identified by a host-name, such as alpha.ho.att.com, which is then translated into an IP address by a so called Domain Name Server (DNS). Currently, DNS table construction, and modifications thereof to include or change the binding (mapping) of the name of a host to it's IP address, is performed manually by system administrators. The DNS tables are static in nature, and are changed only when a) new hosts are added, b) existing hosts are removed, or c) existing hosts are relocated within the network.

When a client must communicate with a server, e.g., named alpha.ho.att.com, if the client does not already have the corresponding IP address for server alpha.ho.att.com stored in its cache, it requests the IP address of server alpha.ho.att.com from the DNS. When the DNS sends the IP address, the client stores the IP address in its cache in association with alpha.ho.att.com and attempts to establish an IP connection to the server. In an ATM network, the server's IP address must also be translated into an ATM address, which is a layer-2 address, i.e., using "Classical IP over ATM" per Bellcore's Request for Comments 1577 (RFC 1577) or ATM Forum's LAN Emulation Over ATM specifications, known as LUNI Version 1.0. Once the ATM address of the server is known, an ATM connection, and an IP connection at a higher layer of the protocol stack, can be built to allow the client to communicate with the server.

In offering a multimedia service, a service provider is likely to offer the service by using several identical servers, each serving a group of clients within a geographic region that are assigned to it. When the client wants to obtain the multimedia service, it accesses it's assigned multimedia server. In current networks such server assignments to clients are fixed.

If a multimedia server a) becomes unable to serve any more clients unless some of the active clients complete their sessions, because it is serving too many clients, or b) becomes unable to serve it's clients due to a system or network failure, a client attempting to establish a connection to the impaired system to obtain multimedia service will get a failure message. This is so even though there may be other servers in the network that can provide the multimedia service.

SUMMARY OF THE INVENTION

We have recognized that there is a need to allocate servers to clients on a dynamic basis, as a function of the ability of each server to serve new clients. To this end, it is necessary to dynamically and automatically update the name server tables, e.g., the DNS tables, in response to changes in the ability of each multimedia server to serve new clients. It is also necessary, in accordance with the principles of the invention, to dynamically modify the information within each client regarding the identity of the server assigned to serve that client.

The invention described herein relates to a system for monitoring each server, and modifying the host name to layer-3 address mapping at a name server. In particular, the layer-3 addresses of the multimedia servers are fixed, as are the names of the multimedia servers made known to the multimedia clients. However, the binding (mapping) of a multimedia server name to a layer-3 address is modified dynamically, e.g., when the multimedia server with that layer-3 address can not serve any new clients.

This is achieved by employing a multimedia server manager, somewhat related to that described in U.S. patent application No. 08/402,235, still pending which is incorporated herein by reference. The multimedia server manager collects real-time status information so as to determine the ability of the multimedia servers in the network to serve new clients. The multimedia server manager, in conjunction with a name mapper, dynamically modifies the current host name-to-layer-3 address binding in a name server as a function of changes in the ability of the multimedia servers to serve new clients. The name mapper, which may be collocated with the multimedia server manager or may be located on a separate server, manages the name server's dynamic name-to-layer-3 address binding, which is also known as the "current server binding table". The name mapper, at least one name server, and several multimedia servers, which may be geographically diverse, are all connected to the multimedia server manager, e.g., via an ATM network.

Each client stores a specified name of a multimedia server, i.e., a virtual host name, from which the client is to obtain multimedia service. In accordance with the principles of the invention, each time a client initiates a multimedia session, the client requests from the name server the layer-3 address of the server that corresponds to the specified server's virtual host name. The name server sends a layer-3 address in response to the multimedia client's request. This layer-3 address is that of the one of the multimedia servers in the network that is currently designated as corresponding to the specified name.

The multimedia client stores the name-to-layer-3 address binding, which it receives from the name server, in it's cache, and then establishes communications with the multimedia server at the received layer-3 address. For each multimedia session, the name-to-received-layer-3 address binding is maintained in the multimedia client. In accordance with the principles of the invention, this binding is erased by the multimedia client after the completion of the session, or at least prior to establishing the next connection to obtain multimedia service. This ensures that the multimedia client obtains a fresh address from the name server for each new session.

If a multimedia server, whose layer-3 address is presently associated with a virtual host name, becomes unable to serve additional clients, the multimedia server manager sends a message to the name mapper to modify the dynamic name to layer-3 address binding. The modification specifies a new binding, by designating in the current server binding table an available server's layer-3 address in place of the server that became unable to serve additional clients. The name mapper then automatically changes the binding in the name servers.

DETAILED DESCRIPTION

Figure 1:
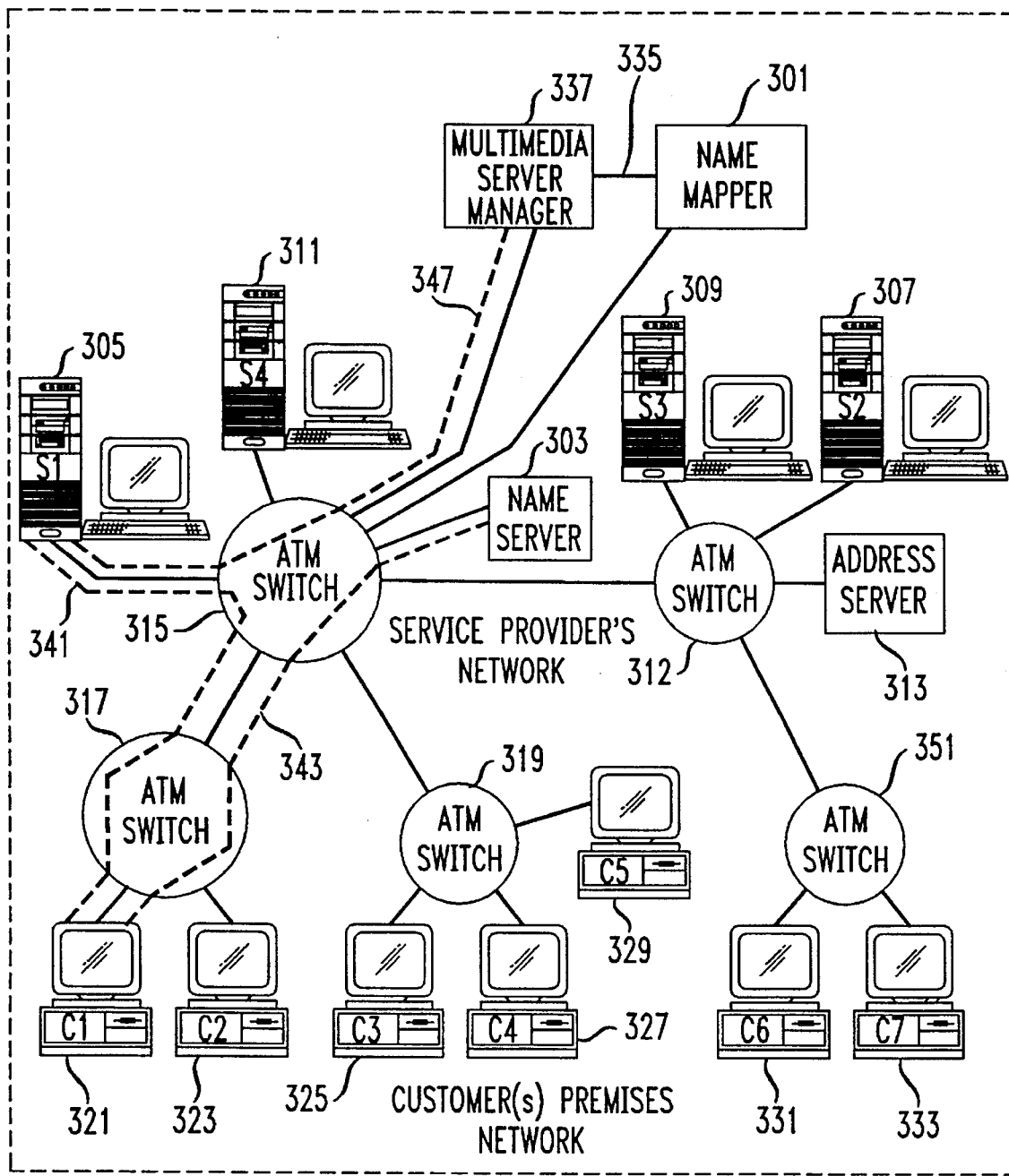
FIG. 1 shows an exemplary arrangement for providing multimedia services, in accordance with the principles of the invention.

FIG. 1 shows an exemplary arrangement for providing multimedia services, in accordance with the principles of the invention. Shown in FIG. 1 are multimedia clients 321, 323, 325, 327, 329, 331, and 333 that have subscribed to a particular multimedia service. Each multimedia client is an ATM end station connected to an ATM network. In particular, multimedia clients 321 and 323 are connected to ATM switch 317; multimedia clients 325, 327, and 329 are connected to ATM switch 319; and multimedia clients 331 and 333 are connected to ATM switch 351. Note that solid lines represent physical connections while dashed lines represent logical connections.

FIG. 1 also shows a pool of multimedia servers, including multimedia servers 305, 307, 309, and 311. Multimedia servers 305, 307, 309, and 311 serve ATM clients 321, 323, 325, 327, 329, 331, and 333. Multimedia servers 305, 307, 309, and 311 are connected to the ATM network. In particular, servers 305 and 311 are connected to ATM switch 315 while servers 307 and 309 are connected to ATM switch 312. When multimedia server 305 serves client 321, for example, ATM connection 341 between server 305 and client 321 is established. Connection 341 traverses ATM switches 315 and 317.

ATM switches 312, 315, 317, 319, and 351 are interconnected by the facilities of an ATM service provider's network, thereby allowing connections to be established between ATM end-points (hosts) connected to any of these ATM switches. The ATM switches may, on an individual basis, belong to the ATM service provider or to the customer(s).

FIG. 1 also shows name mapper 301 and name server 303, both connected to ATM switch 315. Name mapper 301 is connected to multimedia server manager 337, either a) directly, via connection 335, if they are collocated, or b) otherwise, via an ATM switch, e.g., ATM switch 315.

Multimedia server manager 337 is connected to each multimedia server via an ATM connection. This connection is used to allow multimedia server manager 337 to monitor the service state of the multimedia server. ATM connection 347 is an exemplary connection that connects multimedia server manager 337 to multimedia server 305 via ATM switch 315.

Address server 313 is connected to ATM switch 312. It performs layer-3 to layer-2, e.g., ATM, address mapping. For example, address server 313 can be 1) a LAN Emulation Server (LES) if multimedia client 321 and the multimedia server are in the same Emulated LAN (ELAN), 2) an address resolution protocol (ARP) Server or a Next Hop Routing (NHR) Server, if multimedia client 321 and the multimedia server do not use LAN emulation, but instead use classic IP over ATM, or 3) the like. An exemplary ARP server is defined in Bellcore RFC 1577. An exemplary NHR Server is defined in Internet Engineering Task Force (IETF) Next Hop Routing Protocol (NHRP) specifications.

The multimedia service provider initially designates the names of multimedia servers to serve the multimedia clients. These names do not correspond fixedly to any actual multimedia server, and are thus "virtual host names" that serve as place holders which will ultimately be translated into a designation, e.g., a layer-3 address, of an actual multimedia server. For example, the multimedia server named TANGO is designated to serve multimedia clients 321 and 323; the multimedia server named RUBY is designated to serve multimedia clients 325, 327, and 329; and the multimedia server named KLEO is designated to serve multimedia clients 331 and 333. Note that these virtual host names are arbitrary, made-up names. Each client stores the virtual host name assigned to it and from which the client expects to obtain multimedia service.

The layer-3 address of name server 303 is known to, e.g., stored in, all the multimedia clients so that they can all access it. Each multimedia client accesses name server 303 to obtain the layer-3 address of an actual multimedia server that corresponds to the virtual host name it has stored, in accordance with the principles of the invention.

By way of example, multimedia servers 305, 307, 309, and 311 are operated by the multimedia service provider and have layer-3 addresses S1, S2, S3, and S4, respectively. Assuming, for ease of exposition, that the multimedia servers use the well-known Internet Protocol (IP) as the layer-3 protocol, exemplary layer-3 (IP) addresses for these servers, chosen at random for illustrative purposes, are illustrated in Table 1.

TABLE 1

| Multimedia Server | IP Address |
| --- | --- |
| S1 | 135.189.090.001 |
| S2 | 128.190.003.001 |
| S3 | 194.209.211.095 |
| S4 | 197.176.155.001 |

The initial assignment of multimedia servers to clients, which is typically the preferred assignment, may be based on criteria desired by the implementor, such as a) minimizing the geographic disparity between clients and the server, or b) maximizing the performance through the network. Other criteria, chosen by the implementor, may also be employed.

The default server binding table is a preprogrammed static table according to which the multimedia servers are initially allocated to serve clients, e.g., in an arrangement the implementor believes will best satisfy the desired criteria. The default server binding table contains the preferred name-to-layer-3 address bindings (mapping). The default server binding table is stored within multimedia server manager 337. An exemplary default server binding table is illustrated in Table 2.

TABLE 2

| TANGO | 135.189.090.001 (S1) |
| --- | --- |
| RUBY | 128.190.003.001 (S2) |
| KLEO | 194.209.211.095 (S3) |

There is also a current server binding table, which is stored in name server 303. The current server binding table is used to perform the translation from a virtual host name to a layer-3 address in response to a request for a multimedia service by a multimedia client. Upon system initialization, the default server binding table and the current server binding table are the same.

Each multimedia server has two states, 1) an availability state and 2) a usage state. The availability state can take one of two values, a) "available", which indicates the server is working properly, and b) "unavailable", which indicates that the server is down or otherwise inaccessible. The usage state of each multimedia server can take one of three values, 1) "idle", indicating that there are no clients being served by the multimedia server, 2) "active", indicating that there is at least one client being served by the multimedia server but that there remains in the multimedia server additional capacity to serve other clients, and 3) "full", indicating that a predetermined service capacity threshold has been reached. The full value indicates that the multimedia server cannot serve any additional clients, while the idle and active values indicate that the multimedia server is not full, and so can serve additional clients. These two states are combined to form a single "service" state for a multimedia server. If the multimedia server is idle or inactive while being available, its service state is "NOT BUSY". If the multimedia server is unavailable or full, its service state is BUSY.

The service state of each multimedia server is monitored by multimedia server manager 337. Multimedia server manager 337 causes the allocation of a new multimedia server to serve clients when the service state of the already allocated multimedia server for a particular virtual host name becomes BUSY. For such a reallocation, only a multimedia server whose service state is NOT BUSY may be employed.

For example, when multimedia client 321 wants to obtain a multimedia service from it's assigned multimedia server named TANGO, it first builds an ATM connection 343 to name server 303 and requests the layer-3 address corresponding to the multimedia server named TANGO. Name server 303 searches the current server binding table and determines that TANGO's layer-3 address is S1 (135.189.090.001). Therefore, name server 303 responds to multimedia client 321 with 135.189.090.001. Next, multimedia client 321 receives the layer-3 address of 135.189.090.001 from name server 303, and checks it's address cache to determine if it has the ATM address, which is a layer-2 address, corresponding to IP address 13.5.189.090.001. If multimedia client 321 does not have the ATM address, it obtains the ATM address from address server 313. Once multimedia client 321 has the ATM address, it builds an ATM connection, e.g., ATM connection 341, to S1 and requests therefrom the desired multimedia service.

In accordance with the principles of the invention, right after building the ATM connection 341 to the multimedia server 305, multimedia client 321 deletes the layer-3 address entry corresponding to server TANGO from it's cache. Advantageously, this step ensures that each time a new multimedia service session is initiated, multimedia client 321 obtains a fresh layer-3 address for the multimedia server corresponding to TANGO from name server 303. This is necessary since the assignment of a multimedia server to TANGO may change over time.

If, for example, at a particular time, multimedia server 305 determines that it can not serve any more clients, it sets its service state to "BUSY". It also informs multimedia manager 337 that it's service state has been changed to "BUSY". As mentioned above, there is a permanent or switched virtual connection 347 between multimedia server manager 337 and multimedia server 305, so that the multimedia server 305 can send such state change messages to multimedia server manager 337. Alternatively, if the multimedia server manager 337 has not heard from the server after a time-out period, it can poll multimedia server 305 to learn about it's service state.

Multimedia server manager 337 changes it's host-state table, which is a table that shows the most current service status of each multimedia server in the network, to reflect that the service state of multimedia server 305 is now "BUSY". An exemplary host-state table reflecting the new state is shown in Table 3.

TABLE 3

| S1 | BUSY |
| --- | --- |
| S2 | NOT BUSY |
| S3 | NOT BUSY |
| S4 | NOT BUSY |

Since multimedia server 305 can not serve any more clients, multimedia server manager 337 dispatches multimedia server 311 in place of multimedia server 305 for all new multimedia service requests. This is done by multimedia server manager 337 informing name mapper 301 that the new binding for all names that were bound in the current binding table of name server 303 to S1, the IP address of multimedia server 305, should be changed to S4, the IP address of multimedia server 311. For example, name mapper 301 formulates a message addressed to name server 303 which contains <old server=S1, new server=S4>. Upon receipt of this message, name server 303 modifies it's current server binding table, which contains the actually used name-to-layer-3 address binding, such that all server names bound to the layer-3 address of S1 are changed to be bound to S4's layer-3 address. Table 4 depicts the updated current server binding table of name server 303.

TABLE 4

| TANGO | S4 |
| RUBY | S2 |
| KLEO | S3 |

At a later time, multimedia client 321 attempts to initiate another multimedia session, by connecting to name server 303 and requesting the layer-3 address corresponding to the multimedia server named TANGO. Name server 303 responds with S4, which is the layer-3 address of multimedia server 311. The process within multimedia client 321 continues, as described above, a) for obtaining the ATM address corresponding to IP address S4, and b) connecting to multimedia server 311, to obtain the multimedia service.

At an even later time, multimedia server 305 determines that it can serve other clients. As a result, it sets it's service state back to "NOT BUSY", and informs multimedia server manager 337 of the change in its service state. Multimedia server manager 337 then updates its host-state table. Table 5 shows the new host-state table within the multimedia server manager 337 (assuming there have been no other changes in the network).

TABLE 5

| S1 | NOT BUSY |
| S2 | NOT BUSY |
| S3 | NOT BUSY |
| S4 | NOT BUSY |

Multimedia server manager 337 may choose to go back to the default configuration, namely, the initial configuration stored in the default binding table, e.g., the configuration in which S1 represented TANGO. If so, multimedia service manager 337 informs name mapper 301 that S1 should be used instead of S4 for all new calls. Name mapper 301, in turn, sends an <old server=S4, new server=S1> message to name server 303. Upon receipt, name server 303 modifies it's name-to-layer-3 address binding in the current server binding table. The resulting current server binding table is shown in Table 6. It is advantageous to return to the default configuration if it corresponds to an optimum allocation of the servers.

TABLE 6

| TANGO | S1 |
| RUBY | S2 |
| KLEO | S3 |

Figure 2:
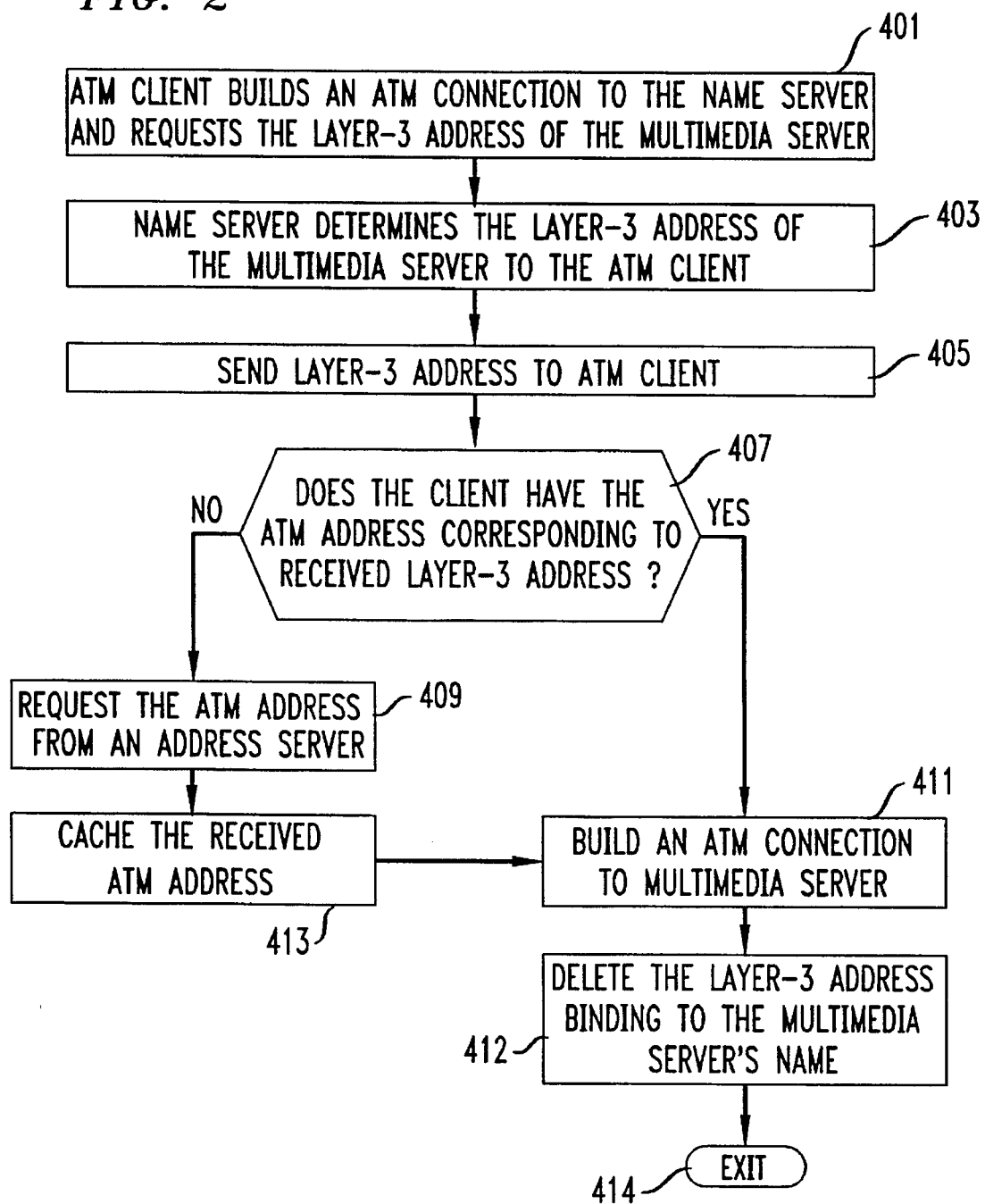
FIGS. 2, 3, and 4 show exemplary processes depicting a) how a client obtains a multimedia service from one of the multimedia servers of FIG. 1, and b) how the multimedia servers of FIG. 1 are allocated, in accordance with the principles of the invention.
Figure 3:
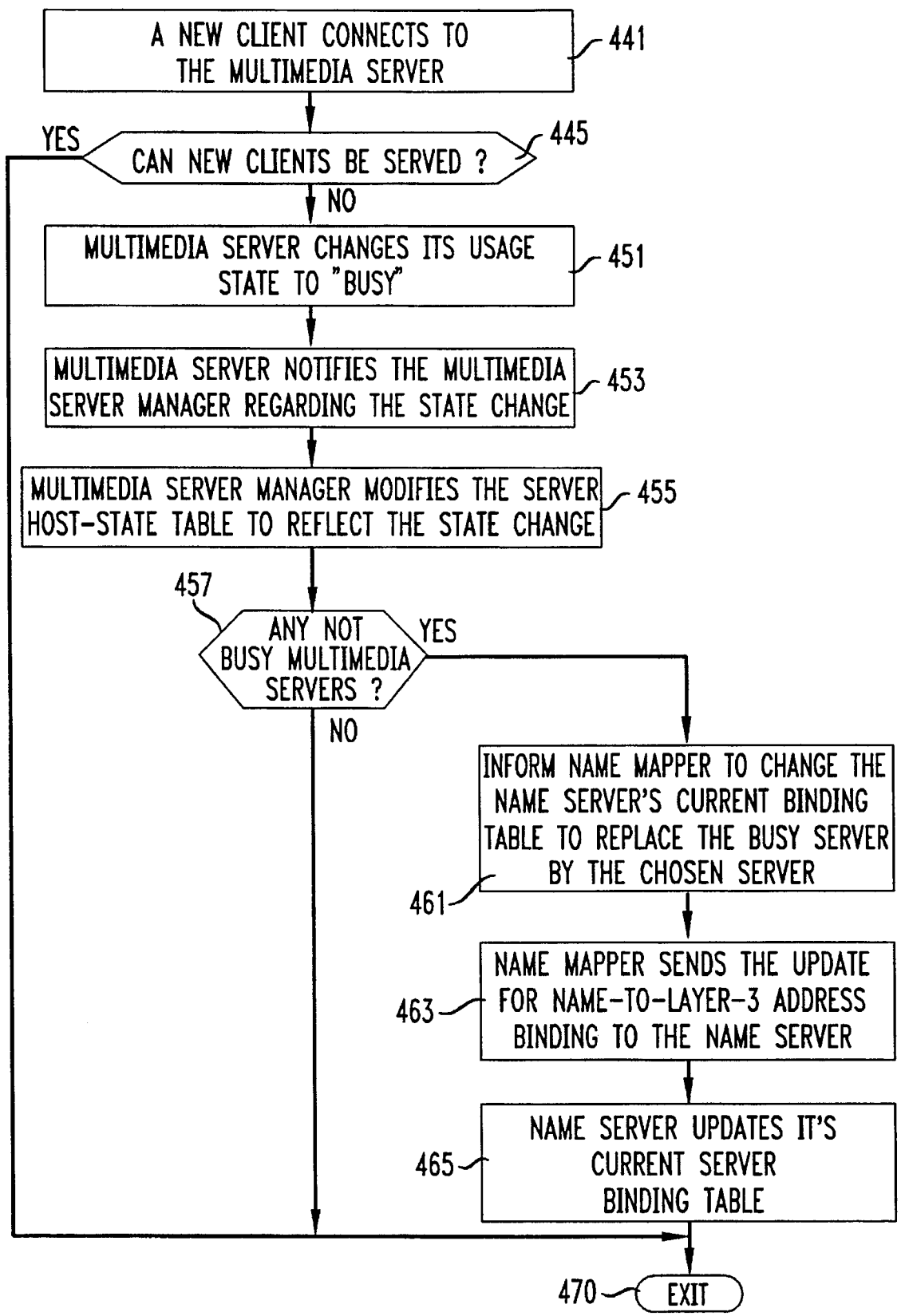
Figure 4:
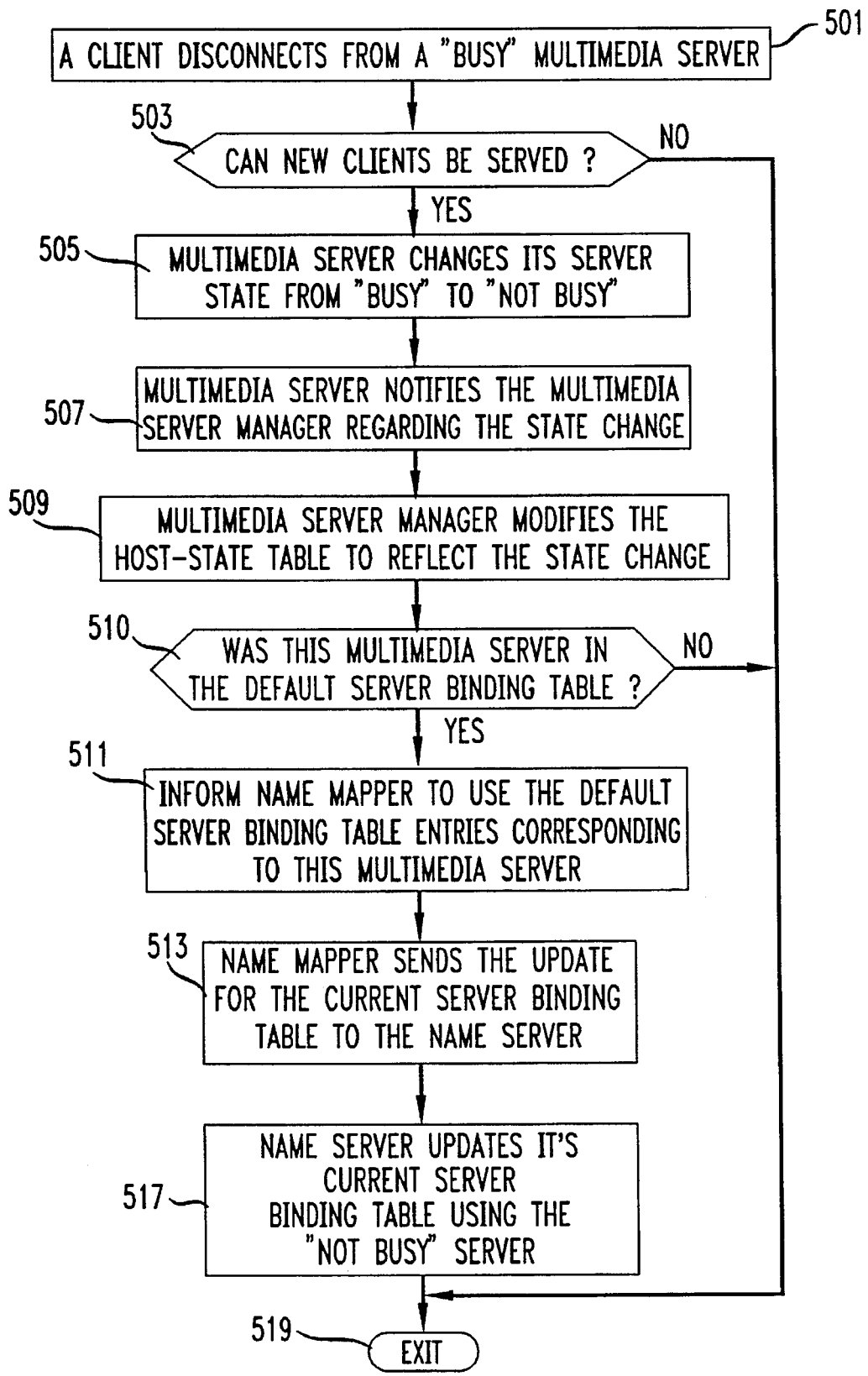

FIGS. 2, 3, and 4 show exemplary processes depicting a) how a client obtains a multimedia service from one of the multimedia servers in the service provider's network, and b) how the multimedia servers are allocated as a function of their service state, in accordance with the principles of the invention. The process is entered in step 401 of FIG. 2 when a multimedia client, e.g., multimedia client 321, builds an ATM connection to name server 303 and requests the layer-3 address corresponding to the name of its assigned multimedia server, e.g., TANGO. Next, in step 403, name server 303 determines the layer-3 address corresponding to the name of the server indicated in the request from multimedia client 321, using the current server binding table. Thereafter, in step 405, name server 303 transmits to multimedia client 321 the layer-3 address of multimedia server 305 (S1).

In conditional branch point 407, multimedia client 321 tests to determine if it already has the ATM address corresponding to the layer-3 address sent by name server 303. If the test result is step 407 is YES, indicating that the multimedia client 321 has the ATM address of multimedia server 305, control passes to step 411, in which multimedia client 321 builds an ATM connection 343 to multimedia server 305, if one already does not exist, and requests the service. Thereafter, multimedia client 321 erases the multimedia server's name and layer-3 binding in step 412, in accordance with an aspect of the invention. The process is then exited in step 414.

If the test result in step 407 is NO, indicating that multimedia client 321 does not have the ATM address corresponding to the layer-3 address of the multimedia server, control passes to step 409, in which multimedia client 321 requests the ATM address from address server 313. After completion of step 409, control passes to step 413, in which multimedia client 321 stores in its cache the ATM address corresponding to the layer-3 address for future use. Control then passes to step 411 and the process continues as described above.

FIG. 3. shows an exemplary process for allocating a multimedia server based on a service state change. The process is entered in step 441, when a new client connects to the multimedia server, as described in FIG. 2. Next, control passes to conditional branch point 445, in which multimedia server 321 tests to determine if it can serve more clients. If the test result in step 445 is YES, indicating that more clients can be served, control passes to step 470, and process is exited. If the test result in step 445 is NO, indicating that the multimedia server can not serve any new clients, control passes to step 451, in which multimedia server 305 sets it's service state to "BUSY". Next, in step 453, multimedia server 305 sends a message to multimedia server manager 337 indicating that the state of multimedia server 305 has changed to "BUSY". Upon receipt of the message by multimedia server manager 337, control passes to step 455, in which multimedia server manager 337 modifies its host-state table to reflect that the new service state of multimedia server 305 is "BUSY".

Next, in conditional branch point 457, multimedia server manager 337 tests to determine if there are any "NOT BUSY" servers listed in its host-state table. If the test result in step 457 is YES, indicating that there is at least one "NOT BUSY" server in the host-state table, control passes to step 461, in which multimedia server manager 337 informs name mapper 301 that it should change the database of name server 303 to replace the "BUSY" server's layer-3 address with that of the newly allocated server's layer-3 address, e.g., by sending an <old server, new server> message. In step 463, name mapper 301 receives the message from multimedia server manager 337, and sends a request to name server 303 to substitute the "new layer-3 address" in place of "old layer-3 address" in it's current server binding table. Next, in step 465, name server 303 implements the change in it's current server binding table, thus assigning the new server in place of the BUSY server. The process is then exited in step 470.

If the test result in step 457 is NO, indicating that there are no NOT BUSY servers available, control passes to step 470 and the process is exited.

FIG. 4 describes the process that is carried out when the service state of a BUSY server changes to NOT BUSY after one or more clients drop their connections with the server. The process starts in step 501, when a client drops its connection with a BUSY multimedia server. Next, in conditional branch point 503, the multimedia server determines if it can serve new clients. If the test result in step 503 is NO, indicating that the server still can not serve any more clients, i.e., it is still in the BUSY state, the process is exited in step 519.

If the test result in step 503 is YES, indicating that a previously BUSY multimedia server can serve at least one more client, control passes to step 505, in which the multimedia server sets its service state to "NOT BUSY". Next, in step 507, the multimedia server sends a message to multimedia server manager 337 indicating that the multimedia server's state has changed to "NOT BUSY". Thereafter, in step 509, multimedia server manager 337 modifies its server database to reflect that the multimedia server's new state is "NOT BUSY".

In conditional branch point 510, multimedia server manager 337 determines if the server is listed in the default server binding table, which, as noted above, is the preprogrammed optimal table in which servers are best allocated to serve clients by geographic region. If the test result in 510 is YES, indicating that the multimedia server that just changed state was in the default (or initial) configuration prior to becoming BUSY, control passes to step 511, in which multimedia manager 337 informs name mapper 301 that the default table entry is to be used for the multimedia server that has just changed back to NOT BUSY. Next, in 513, name mapper 301 sends a message to name server 303 to update the current server binding table. In 517, name server 303 updates its current server binding table to allocate the multimedia server that has just changed to NOT BUSY as it was allocated in the default server binding table. Steps 510 through 517 are optional.

If the test result in 510 is NO, indicating that the multimedia server that has just changed state is not in the default server binding table, control passes to step 519 and the process is exited.

Figure 5:
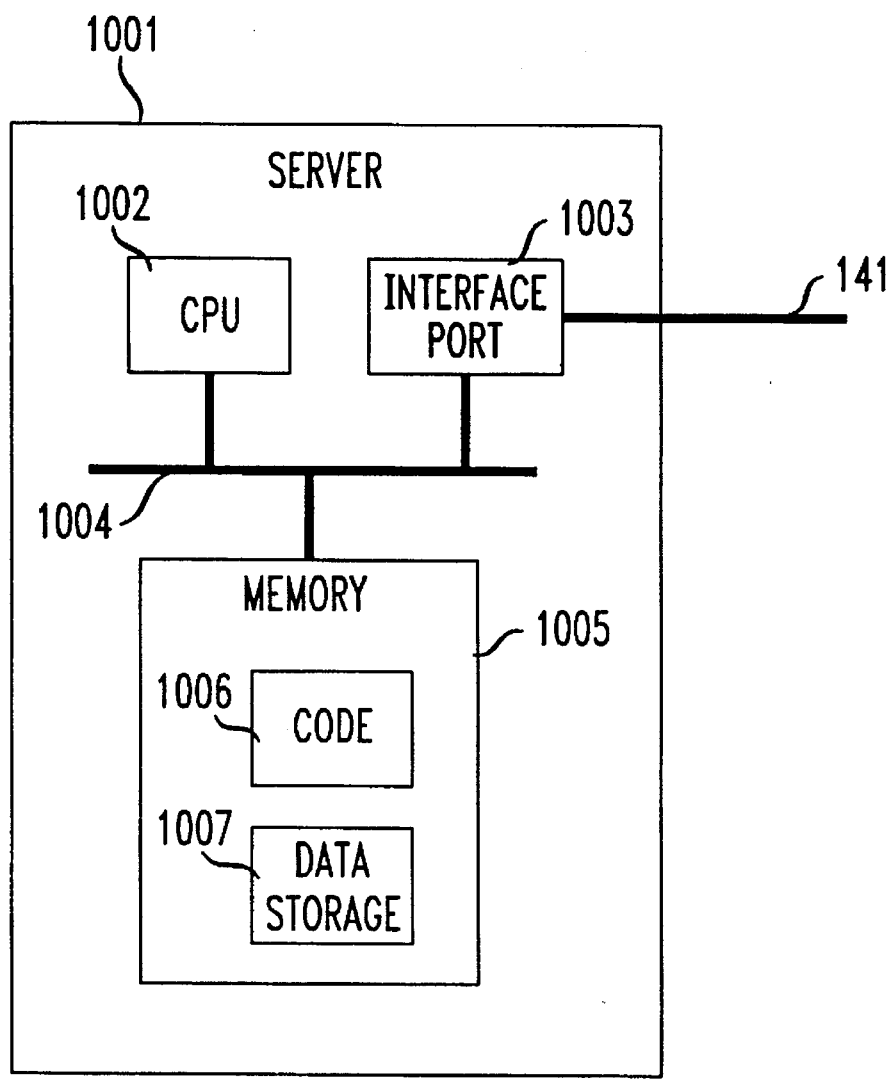
FIG. 5 is a block diagram view of an exemplary embodiment of a generic system, which may serve as the name mapper, the name server, the multimedia server manager, or a client of FIG. 1.

FIG. 5 is a block diagram view of an exemplary embodiment of generic system 1001, which may serve name mapper 301, name server 303, and multimedia server manager 337. Each server 1001 includes a) central processing unit (CPU) 1002, b) interface port 1003 c) data bus 1004 and d) memory 1005. Central processing unit (CPU) 1002 provides all the computational capability necessary to control the processes of server 1001. Bus 1004 provides for the exchange of data between the components of server 1001. Interface port 1003 provides for the exchange of data between server 1001 and devices external to server 1001, e.g., via ATM connections. To this end, interface port 1003 contains, for example, well-known data transceivers. Memory 1005 includes 1) code portion 1006, which contains the instructions (program) used by CPU 1002 to control the processes of server 1001, such as those described herein above, and data storage portion 1007, which contains information, such as the current server binding table, necessary to the server to perform its specific function.

The architecture of a client may also be the same as that of server 1001. However, typically a client will contain slower components and its code portion will contain instructions for executing client functions, such as the foregoing process for requesting multimedia service from a server, rather than server functions. A client may also include hardware for use in providing a video display and for receiving user input.

Note that the functionality of name mapper 301 can be incorporated into multimedia server manager 337.

The availability state of a server may be inferred rather than explicitly monitored. Also, the usage state may be limited to values "full" and "not full".

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A client capable of requesting a multimedia service from a multimedia server connected on a system having a plurality of multimedia servers that can provide the service, said client being characterized by:

means for storing a predetermined, fixed virtual host name corresponding to said plurality of multimedia servers and identified with said requested multimedia service;

means for transmitting a request for a layer-3 address corresponding to a multimedia server currently available for providing the requested service identified with the virtual host name from among the plurality of multimedia servers that can provide the service, said means for transmitting being actuated every time, and prior to, said client establishes a new layer-3 connection for obtaining the requested multimedia service, and a cache for storing a binding between the stored virtual host name and a layer-3 address of the corresponding multimedia server currently available for providing the requested service, said cache being cleared prior to when said client establishes said new layer-3 connection, said binding of said new layer-3 connection received in response to said request being stored in said cache.

2. The invention as defined in claim 1 wherein said client is further characterized by:

means for obtaining the layer-2 address corresponding to a layer-3 address that is received in response to said request.

3. The invention as defined in claim 1 wherein said client is further characterized by:

means for obtaining the ATM address corresponding to a layer-3 address that is received in response to said request.

4. A method for use in a client capable of requesting a multimedia service from a multimedia server connected on a system having a plurality of multimedia servers that can provide the service, said client having a cache for storing a binding between a virtual host name and a layer-3 address corresponding to a multimedia server currently available for providing the requested services, the method comprising the steps of:

storing in said client a predetermined, fixed virtual host name corresponding to said plurality of multimedia servers and identified with said requested multimedia service;

prior to each request for multimedia service carried over each new layer-3 connection:

clearing said cache;

transmitting from said client a request for a layer-3 address of a multimedia server that corresponds to a multimedia server currently available for providing the requested multimedia service identified with the virtual host name from among the plurality of multimedia servers that can provide the service;

receiving, in response to said request, the layer-3 address of the multimedia server that currently corresponds to said stored virtual host name;

storing in said cache a binding between the stored virtual host name and said received layer-3 address; and establishing a layer-3 connection to said received layer-3 address.

* * * * *